No. 724,947. PATENTED APR. 7, 1903.
B. C. ROWELL.
INTERLOCKING MACHINE FOR RAILWAYS.
APPLICATION FILED AUG. 29, 1900.
NO MODEL. 7 SHEETS—SHEET 1.
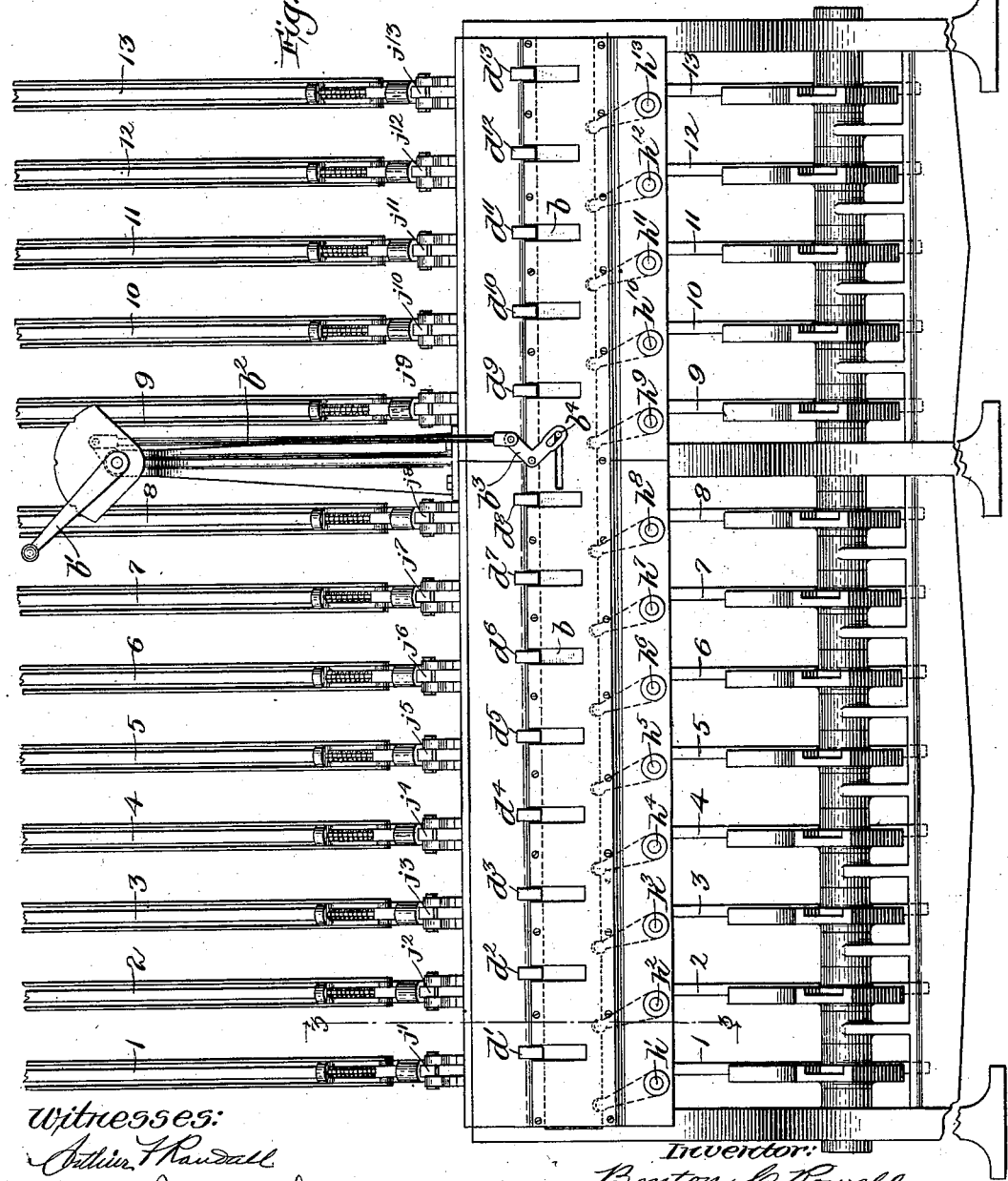
Witnesses:
Arthur F. Randall
G. A. Rockwell
Inventor:
Benton C. Rowell,
by J. E. Maynadier
Attorney.

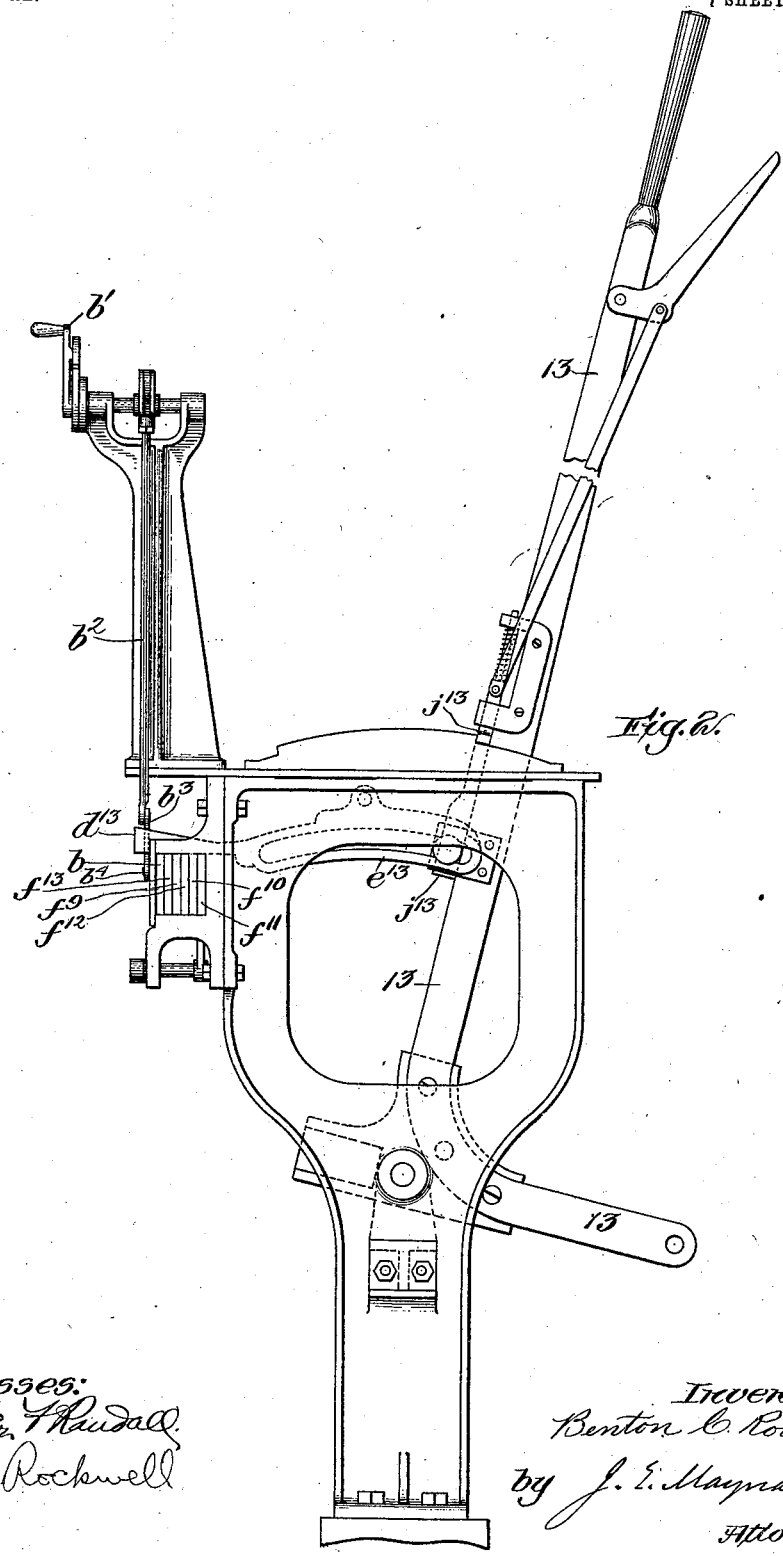

No. 724,947. PATENTED APR. 7, 1903.
B. C. ROWELL.
INTERLOCKING MACHINE FOR RAILWAYS.
APPLICATION FILED AUG. 29, 1900.
NO MODEL. 7 SHEETS—SHEET 3.
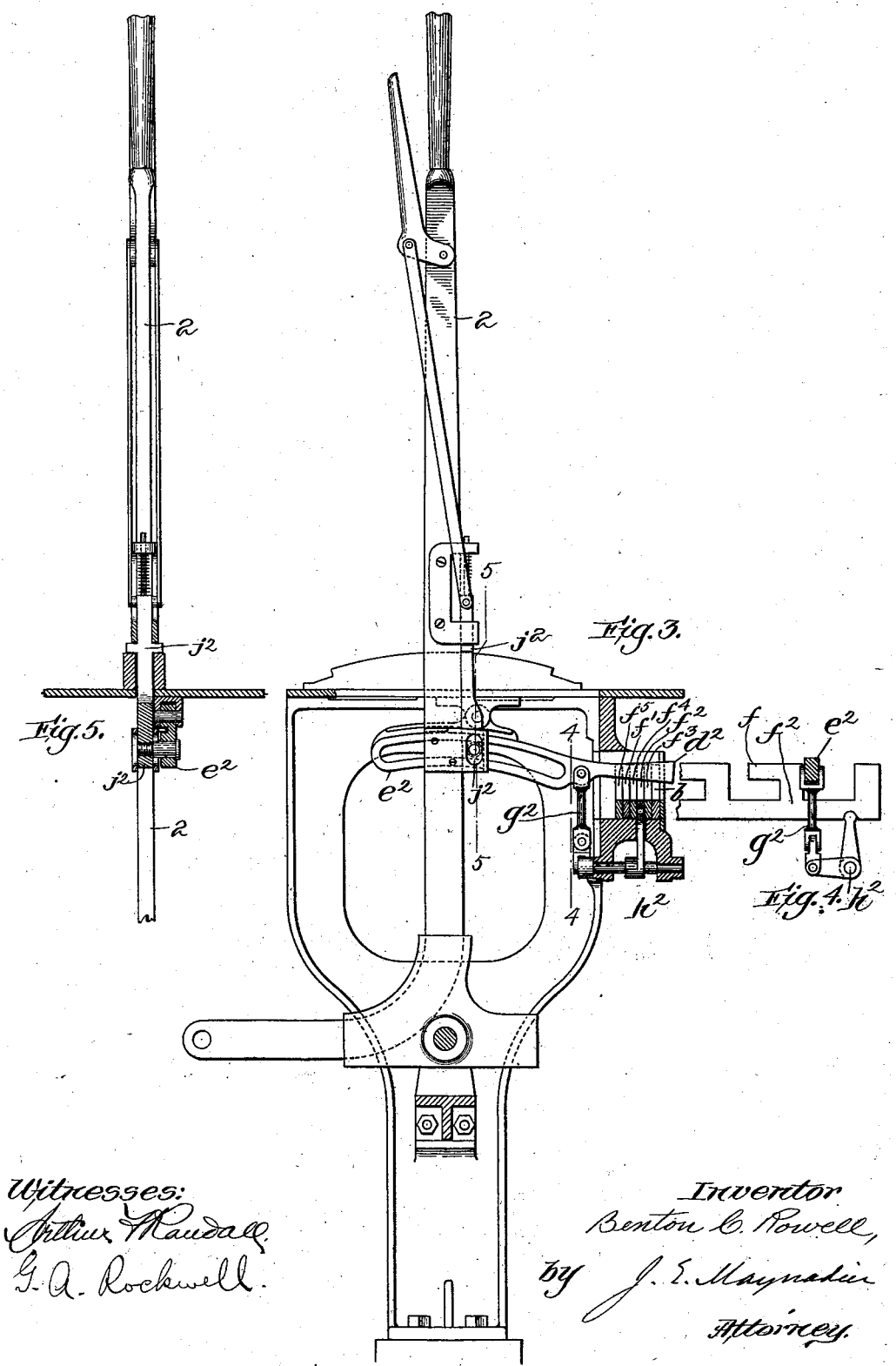
Witnesses:
Arthur Maudall
G. A. Rockwell
Inventor
Benton C. Rowell,
by J. E. Maynadier
Attorney.

No. 724,947. PATENTED APR. 7, 1903.
B. C. ROWELL.
INTERLOCKING MACHINE FOR RAILWAYS.
APPLICATION FILED AUG. 29, 1900.
NO MODEL. 7 SHEETS—SHEET 4.
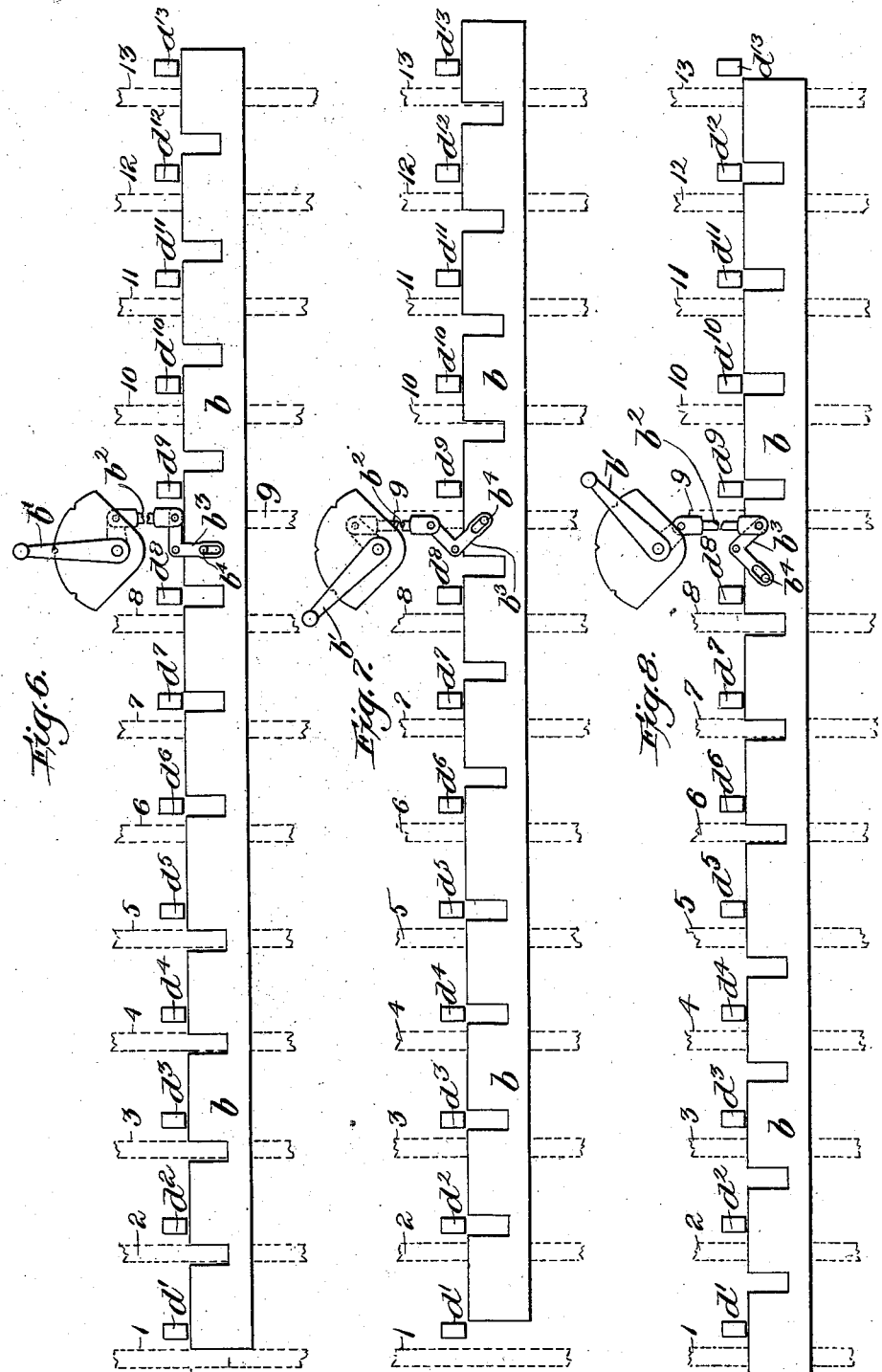

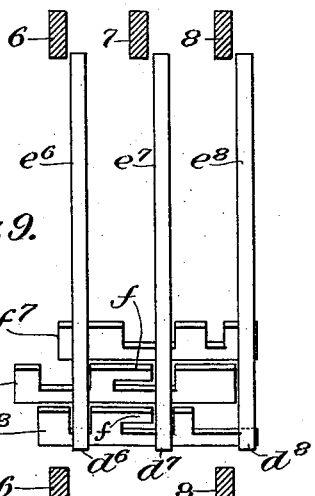
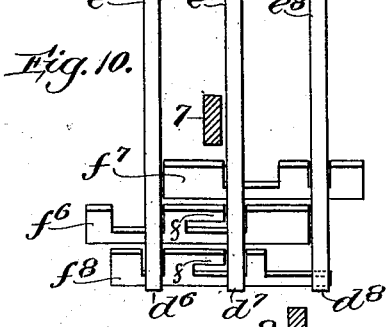
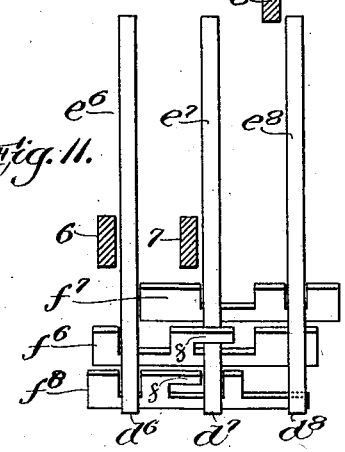

No. 724,947. PATENTED APR. 7, 1903.
B. C. ROWELL.
INTERLOCKING MACHINE FOR RAILWAYS.
APPLICATION FILED AUG. 29, 1900.
NO MODEL. 7 SHEETS—SHEET 6.
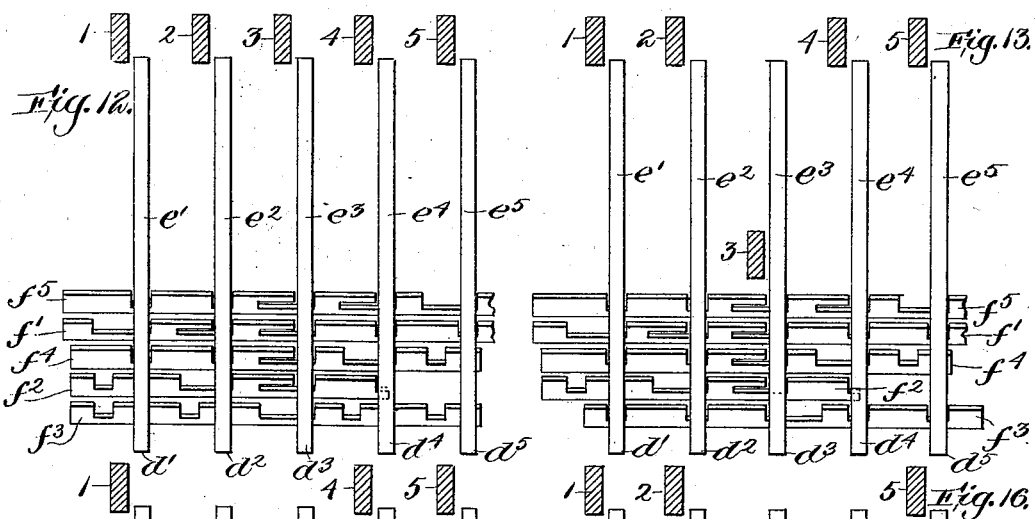
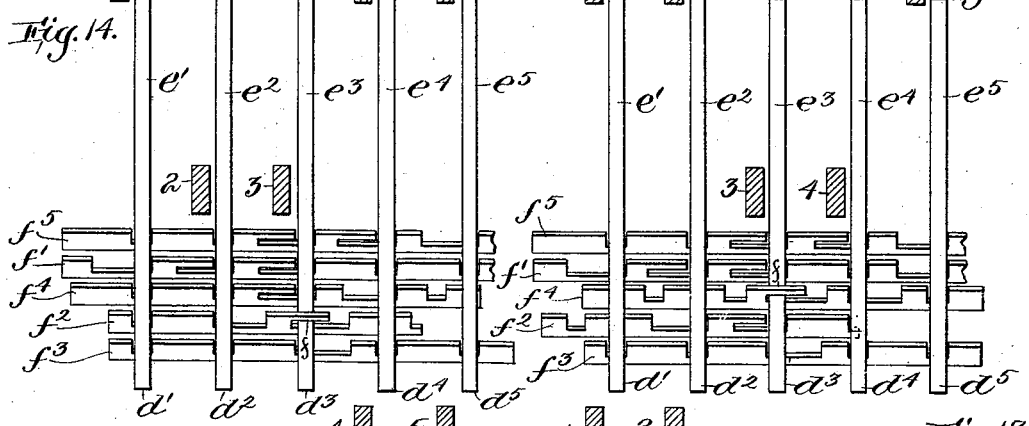
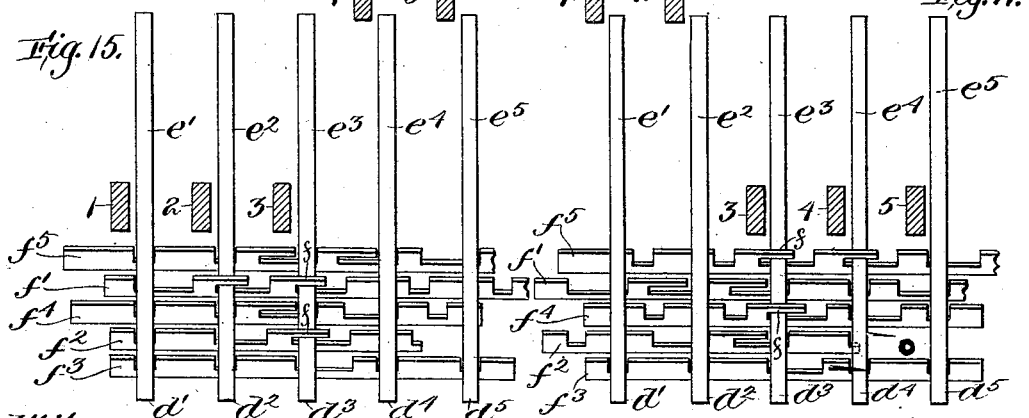
Witnesses:
Arthur F. Randall
G. A. Rockwell
Inventor:
Benton C. Rowell,
by J. E. Maynadier
Attorney.

No. 724,947. PATENTED APR. 7, 1903.
B. C. ROWELL.
INTERLOCKING MACHINE FOR RAILWAYS.
APPLICATION FILED AUG. 29, 1900.
NO MODEL. 7 SHEETS—SHEET 7.
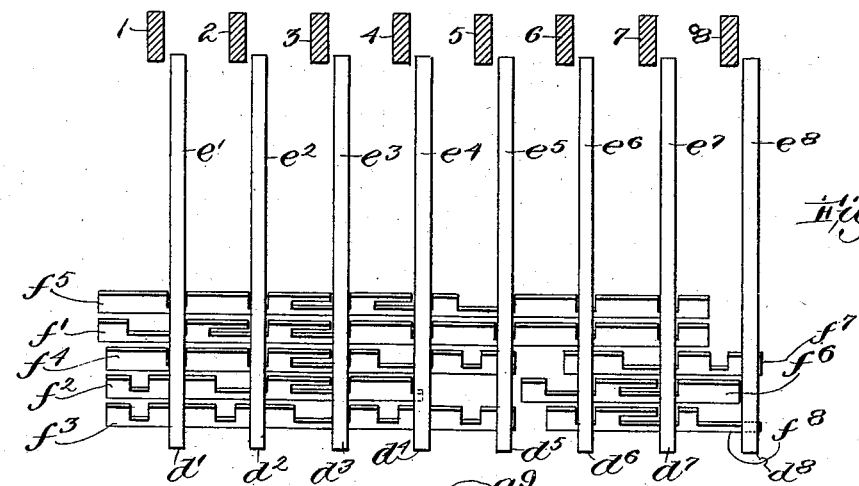
Fig. 18.
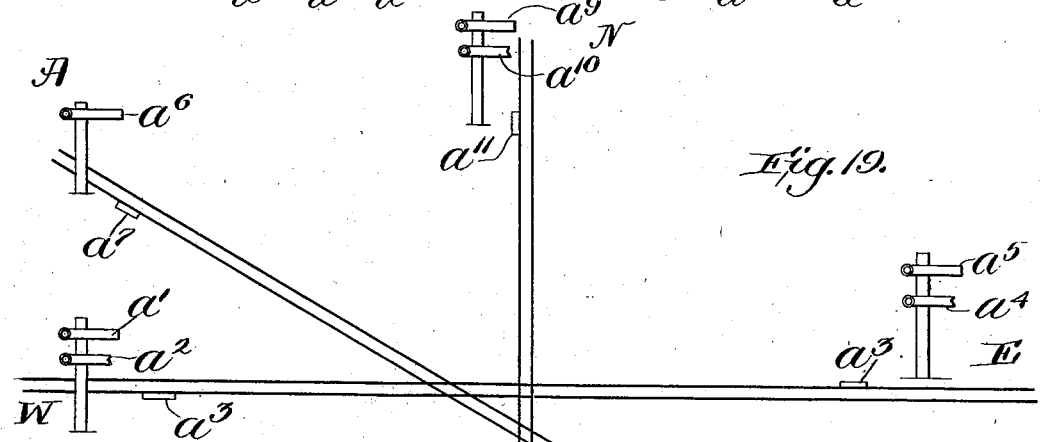
Fig. 19.
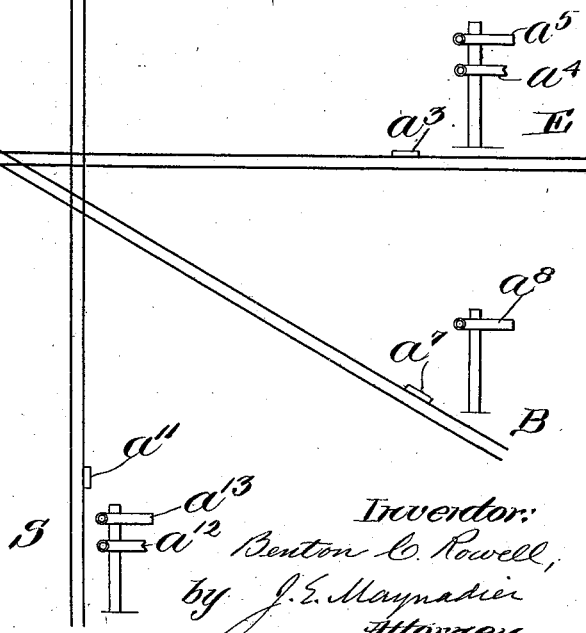
Witnesses:
Arthur T. Randall
G. A. Rockwell
Inventor:
Benton C. Rowell,
by J. E. Maynadier
Attorney.

UNITED STATES PATENT OFFICE.

BENTON C. ROWELL, OF CHICAGO, ILLINOIS, ASSIGNOR TO THE ROWELL POTTER SAFETY STOP COMPANY, OF PORTLAND, MAINE, A CORPORATION OF MAINE.

INTERLOCKING-MACHINE FOR RAILWAYS.

SPECIFICATION forming part of Letters Patent No. 724,947, dated April 7, 1903.

Application filed August 29, 1900. Serial No. 28,402. (No model.)

*To all whom it may concern:*

Be it known that I, BENTON C. ROWELL, of Chicago, Cook county, in the State of Illinois, have invented a new and useful Interlocking-Machine for Railways, of which the following is a specification, reference being had to the accompanying drawings, in which—

Figure 1 is a front elevation of one of my interlocking-machines. Fig. 2 is an end elevation of that machine. Fig. 3 is a section on line 3 3 of Fig. 1. Fig. 4 is a detail showing the mechanical connection between a locking-bar and its link. Fig. 5 is a section on line 5 5 of Fig. 3. Figs. 6, 7, and 8 show three positions of the selector-bar. Figs. 9 to 19 are diagrams, described below.

In all interlocking-machines heretofore known all the initial levers are free to be moved; but the reversing of either locks all the others, and this requires locking mechanism actuated by any one initial lever reaching to all the others—that is, each initial lever must actuate not only locking mechanism for its complementary levers, but also for each of the other initial levers—or, in other words, in interlocking-machines prior to my invention there were as many groups of levers as routes, one group for each route, and reversing the initial lever of any group unlocked one or more of its complementary levers, but locked the initial levers of all the other groups.

The main feature of my invention is the independence of the initial levers, for in my invention the function of locking and unlocking the initial levers is performed by a selecting mechanism which in one position unlocks one of the initial levers and locks the others, in another position unlocks another one of the initial levers, locking the others, and so on.

Another feature of my invention is a simple, strong, and durable interlocking mechanism for interlocking a group of levers, and this feature of my invention is the combination, with the levers, of links each of which is engaged by a locking-bar moved endwise by another link—that is, reversing the first lever of a group swings its link on a fulcrum, as in prior machines of this class, and also moves a locking-bar to free the next lever to be reversed, reversing the second lever of the group swings its link and moves a second locking-bar to lock the first link in its reverse position and to free the link of the next lever to be moved, and so on—that is, each link may be locked in either one of two positions by locking-bars moved by other links—and the novelty of this feature of my invention resides in links which interlock with locking-bars.

In the drawings, Figs. 1, 2, 3, 4, and 5, I have shown one of my interlocking-machines with thirteen levers, in three groups, and in Fig. 19 a diagram of three tracks crossing at grade.

The levers 1 to 13 control, respectively, apparatuses $a'$ to $a^{13}$, which must be set by the interlocking-machine to clear the desired route—that is, for example, lever 7 must be reversed or moved from its normal position to clear the apparatuses $a^7$, which normally make track A B impassable for trains from either direction, and, next, lever 6 must be reversed to clear signal $a^6$ for a train running from A to B, or else lever 8 must be reversed to clear signal $a^8$ for a train running from B to A.

It is only when the selector or selecting-bar $b$ is in its middle position (shown in Fig. 6) that initial lever 7 can be reversed to set switch $a^7$ or other like apparatus; but reversing lever 7 unlocks both levers 6 and 8, and lever 6 will be reversed to clear signal $a^6$ or like apparatus for a train from A to B, and reversing lever 6 will lock 7 reversed and 8 normal, or if signal $a^8$ is to be cleared for a train from B to A lever 8 will be reversed immediately after lever 7 is reversed, and reversing lever 8 will lock 7 reversed and 6 normal.

When selector $b$ is brought to the position shown in Fig. 7, lever 3 is unlocked, and reversing that lever unlocks levers 2 and 4, and if a train is to run from W to E lever 2 is next reversed, clearing $a^2$ and locking 3 reversed and 4 and 5 normal and unlocking 1, which is next reversed, clearing $a'$ and locking 2 and 3 reversed and 4 and 5 normal. This double locking of 3, 4, and 5 is not essential, of course; but it somewhat simplifies the construction and provides an extra security. When selector $b$ is brought to the position shown in Fig. 8, initial lever 11 is unlocked, as will be plain without further explanation.

The selector or selecting-bar $b$ is shown as actuated by hand-lever $b'$, connected by rod $b^2$ to bell-crank $b^3$, whose slotted end engages pin $b^4$, and when hand-lever $b'$ is in its first notch on the left, as seen in Figs. 1 and 7, the links of levers 6 to 13, inclusive, are locked by selector $b$. When hand-lever $b'$ is in its middle notch, Fig. 6, the links of levers 1 to 5 and 9 to 13, all inclusive, are locked by selector $b$, and when hand-lever $b'$ is in its last notch on the right, Fig. 8, the links of levers 1 to 8, inclusive, are locked by selector $b$.

It will now be clear that selector $b$ is a locking device for the initial levers 3, 7, and 11 and that when it is in position to unlock either of these initial levers it is in position to lock the others. It is also obvious that this initial locking device may be widely varied in construction and that this feature of my invention is the combination, with the initial levers, of an initial locking device which when set to unlock either of the initial levers locks the others. This is an idea wholly new with me and is of great practical importance, for it does away wholly with the necessity of causing each initial lever to lock all the other initial levers, and it is that necessity which is the source of the very great number of parts and consequent complication of all interlocking-machines heretofore known. I do not mean, of course, that a locking device for two or more levers which when moved to unlock one locks the others is new with me, but simply that the combination of such a locking device with several groups of levers each lever of a group having its individual lock requiring that each lever of any group shall be moved in a certain order is wholly new with me and that I am the first to devise an interlocking-machine with groups of levers each lever with its individual lock controlled by the movement of another lever of that group and also with an initial locking device common to the initial levers of the groups and which must be first set in proper position before the initial lever of any group can be reversed.

The construction of the initial locking device shown—namely, the selector $b$ and the extensions $d'$ $d^2$, &c., of links $e'$ $e^2$, &c.—is the best known to me and has the great advantage that it is as easy to make selector $b$ lock all of the levers of the machine except one group as it is to make selector $b$ lock the initial levers only except one, and, moreover, the reversing of any of the levers locks selector $b$, and consequently selector $b$ cannot be shifted after it is set for any group of levers until all the levers in that group have been set back to normal, when selector $b$ is unlocked and can be moved to position for another group of levers.

It will be observed that selector $b$ cannot be moved by any of the levers of any of the groups and also that locking-bars $f'$ $f^2$, &c., are moved only by the motion of the levers acting through links $e'$ $e^2$, &c., connections $g'$ $g^2$, &c., and rock-shafts $h'$ $h^2$, &c., as usual, so that while selector $b$ partially unlocks all the levers of one group when it locks (or may lock) all the levers of the other groups, yet the initial lever of a group is the only one wholly unlocked by selector $b$, the other levers of that group remaining locked until unlocked in proper order by the movement of the proper levers of that group in the proper order, which movements move the locking-bars $f'$ $f^2$, &c., as above stated. These locking-bars $f'$ $f^2$, &c., act with the links to lock and unlock the levers of each group in proper order—that is, the initial lever of one group having been wholly unlocked by selector $b$ can be reversed, and when reversed the locking-bar $f^7$, controlled by the link of that lever, unlocks the link of the next lever in the group to be reversed (see Fig. 10) and also that the link of the initial lever is locked in the reversed position, as will be plain from Fig. 11, when the next lever is reversed. That feature of my invention embodied in the interlocking devices for a group of levers is the combination of the slotted locking-bars $f'$ $f^2$, &c., with the links $e'$ $e^2$, &c., and is applicable in interlocking-machines generally, whether the selector $b$ be used or not. The locking-bars $f'$ $f^2$, &c., are double-acting—that is, they prevent the levers from being pulled forward and from being thrown back (reversed and returned to normal) except in a certain order—for when the edge of a locking-bar is under part $d'$ of link $e'$ that link cannot be rocked in the direction to allow latch $j'$ of the lever to be lifted, and when part $d'$ is under the part $f$ of a locking-bar link $e'$ cannot be rocked in the opposite direction and latch $j'$ cannot be lifted. The simplest form of this feature of my invention is shown in Figs. 9, 10, and 11, which illustrate a group of three levers 6, 7, and 8, first, with lever 7 unlocked and 6 and 8 both locked by the locking-bar $f^7$ of lever 7; secondly, with lever 7 reversed, 6 and 8 both unlocked, so that either may be reversed; thirdly, with 6 and 7 reversed, with 8 locked normal, and 7 locked reverse; but it is an easy matter to embody this feature of my invention with a greater number of levers, as illustrated in Figs. 12, 13, 14, 15, 16, and 17, which illustrate diagrammatically groups of five levers 1 2 3 4 5 and how each is locked and unlocked by moving each in proper order. Obviously this feature of my invention may be embodied with more levers than five, and in practice a group of levers may contain any number from two to possibly ten or twelve. Also the locking-bars of one group may be caused to coöperate with the links of other groups, as illustrated diagrammatically in Fig. 18, which shows the locking-bars of levers 1 to 8 with the locking-bars of levers 1 and 5 extended as fillers for the three locking-bars of levers 6 to 8.

The operation of my interlocking-machine will be clear without further description.

What I claim as my invention is—

1. The interlocking-machine above described comprising a series of groups of levers, each group with an initial lever; locking mechanism for the levers of each group controlled by the initial levers; and a separate locking mechanism for the initial levers of each group which unlocks one of the initial levers but locks the others as it is set in one or another of its positions.

2. In an interlocking-machine the combination of levers; latches for those levers; links which are locked by the movement of those latches; and a slotted bar which prevents the locking of some of the links, but allows the locking of others, according to the position of the slots in the bar.

3. In an interlocking-machine the combination of a group of levers; latches for those levers; a group of links which are locked by the movement of those latches; a group of slotted locking-bars, each of which prevents the locking of some of the links but allows the locking of others, according to the position of the slots in the bar; and connections between the links and the locking-bars through which the locking of any link moves the slotted locking-bar connected to that link to bring the slots of that locking-bar into or out of the path of movement of other links.

BENTON C. ROWELL.

Witnesses:
J. E. MAYNADIER,
C. B. MAYNADIER.